(12) United States Patent
Huang et al.

(10) Patent No.: US 12,405,136 B2
(45) Date of Patent: Sep. 2, 2025

(54) VIBRATION SENSING OVER PASSIVE OPTICAL NETWORKS (PONs) USING FORWARDING OPTICAL PHASE RETRIEVAL AND TIME-DOMAIN MULTIPLEXED (TDM) SWITCHING

(71) Applicant: NEC Laboratories America, Inc., Princeton, NJ (US)

(72) Inventors: Yue-Kai Huang, Princeton, NJ (US); Ezra Ip, West Windsor, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 751 days.

(21) Appl. No.: 17/713,167

(22) Filed: Apr. 4, 2022

(65) Prior Publication Data

US 2022/0326052 A1 Oct. 13, 2022

Related U.S. Application Data

(60) Provisional application No. 63/170,629, filed on Apr. 5, 2021.

(51) Int. Cl.
*H04B 10/00* (2013.01)
*G01D 5/353* (2006.01)
*H04B 10/071* (2013.01)
*H04B 10/61* (2013.01)
*H04J 14/00* (2006.01)

(52) U.S. Cl.
CPC ....... *G01D 5/35361* (2013.01); *H04B 10/071* (2013.01); *H04B 10/61* (2013.01)

(58) Field of Classification Search
CPC .. G01D 5/35361; H04B 10/071; H04B 10/61; H04B 10/0773; H04B 10/272; G01H 9/004
USPC .............................................. 398/1
See application file for complete search history.

(56) References Cited

U.S. PATENT DOCUMENTS

| | | | | |
|---|---|---|---|---|
| 5,559,624 | A * | 9/1996 | Darcie | H04J 14/0246 398/72 |
| 8,233,797 | B2 * | 7/2012 | Qian | H04L 25/0216 398/67 |
| 10,651,946 | B1 * | 5/2020 | Zhao | H04J 14/025 |
| 2010/0215368 | A1 * | 8/2010 | Qian | H04J 14/0247 398/67 |
| 2014/0085626 | A1 * | 3/2014 | Wei | G01M 11/31 356/73.1 |
| 2016/0123798 | A1 * | 5/2016 | Godfrey | G01H 9/004 73/643 |
| 2017/0279523 | A1 * | 9/2017 | Parkin | H04B 10/0773 |

(Continued)

FOREIGN PATENT DOCUMENTS

| | | | | | |
|---|---|---|---|---|---|
| CA | 1286367 | C | * | 7/1991 | ........ G01M 11/3154 |
| CA | 2247687 | C | * | 4/2003 | ......... H04B 10/2587 |

*Primary Examiner* — Daniel G Dobson
(74) *Attorney, Agent, or Firm* — Joseph Kolodka

(57) ABSTRACT

Aspects of the present disclosure describe systems and methods that advantageously enable vibration-induced optical phase measurement at a centralized optical line terminal (OLT) in a PON architecture. In sharp contrast to existing distributed fiber sensing systems and methods, the optical phase measurements of the present disclosure do not rely on back scattering mechanisms and maintain a sufficient optical signal to noise ratio (OSNR) even after round-trip splitting loss in the PON.

8 Claims, 8 Drawing Sheets

(56) References Cited

U.S. PATENT DOCUMENTS

| | | | |
|---|---|---|---|
| 2020/0153513 A1* | 5/2020 | Gupta | H04B 10/6165 |
| 2024/0089009 A1* | 3/2024 | Kim | H04L 27/02 |

* cited by examiner

VIBRATION SENSING OVER PASSIVE OPTICAL NETWORKS (PONs) USING FORWARDING OPTICAL PHASE RETRIEVAL AND TIME-DOMAIN MULTIPLEXED (TDM) SWITCHING

CROSS REFERENCE TO RELATED APPLICATIONS

This application claims the benefit of Untied States Provisional Patent Application Ser. No. 63/170,629 filed 5 Apr. 2021 the entire contents of which is incorporated by reference as if set forth at length herein.

TECHNICAL FIELD

This disclosure relates generally to optical communications systems, methods, and structures. More particularly, it describes methods and structures providing vibration sensing over passive optical networks (PONs) using forwarding optical phase retrieval and time domain multiplexed (TDM) switching.

BACKGROUND

As those skilled in the art will readily appreciate, centralized radio access networks (C-RAN) are essential components of 5G mobile front-haul access systems. Using a fiber-based passive optical network (PON)—deployed every few square miles—a centralized baseband unit (BBU) may be connected to a cluster of remote radio heads (RRHs) to provide 5G coverage to cities and suburbs.

Providing sensing function over C-RAN may provide a wide range of applications—including network health monitoring for telecom operators—as well as new business opportunities such as traffic/construction identification, and earthquake detection. Due to its wide coverage area, fiber sensing in PON architectures may provide significant sensing advantages as compared with other fiber networks.

However, current standard PON architectures include a passive splitter—typically 32× or 64× split—in between an optical line terminal (OLT) and an end-user optical network unit (ONU), and a round trip loss due to passive splitting (30~40 dB) imposed on a sensing signal makes it nearly prohibitive to implement fiber sensing in PONs. Furthermore—given characteristics of PON architectures—all sensing signals from drop fibers after passive splitting will be combined together if an interrogator is located at the OLT, making it difficult or impossible to sense each of the multiple paths individually.

Previously, the instant Applicants have disclosed techniques for distributed fiber sensing (DFS) over PON using reflective optical gain elements and time-domain multiplexed (TDM) switched sensing control—which generally solves both the splitting loss and multi-path interference issues noted. However, the high cost of a typical DFS interrogator and the additional reflective semiconductor optical amplifier (R-SOA) required at each ONU may not be suitable for large-scale deployment.

SUMMARY

An advance in the art is made according to aspects of the present disclosure directed to systems and methods that advantageously enable vibration-induced optical phase measurement at a centralized optical line terminal (OLT) in a PON architecture. In sharp contrast to distributed fiber sensing, the optical phase measurements do not rely on back scattering mechanisms and maintain a sufficient optical signal to noise ratio (OSNR) even after round-trip splitting loss in the PON.

According to an aspect of the present disclosure, to distinguish the source of vibrations in different drop fiber paths, systems, and methods according to the present disclosure employ TDM switching on optical reflectors from different optical networking unit(s) (ONU). The sensing mechanism may advantageously be integrated into upstream (US) data channels wherein an optical carrier is shared and generated at the OLT. Given the topology of the PON architecture and its short reach application, our inventive systems and methods according to aspects of the present disclosure provides source identification based on fiber segments instead of a particular spatial resolution like DFS. Importantly, our inventive systems and methods according to the present disclosure can distinguish sources from each individual drop fiber paths after the splitter, as well as the feeder fiber before the splitter.

Viewed from a first aspect, systems, and methods according to the present disclosure measure vibration induced phase changes using forwarding optical signals instead of back scattered signals—as in DFS. As a result, our inventive schemes produce much higher OSNR after round-trip splitting loss in PON, hence no sophisticated amplification scheme is required.

Viewed from another aspect, to conduct separate phase measurements on different drop fiber paths at a centralized OLT, our inventive systems and methods employ low-cost reflectors and switches at each of the ONU nodes. A TDM scheme is applied on the switches such that only one reflected optical signal is measured at each instance. Of further advantage, a TDM synchronization clock can be either provided from the centralized interrogator or taken from the existing PON data communications which also uses a shared clock.

Finally, yet another important aspect of systems and methods according to the present disclosure is the integration with existing PON communication channels. Note that with our inventive systems and methods we can retrieve optical phase information from pay-load carrying channels in a slightly modified coherent receiver DSP. Therefore, we may conduct the vibration-induced phase measurement at OLT, if the same carrier is used for all ONUs to provide US communication. Both TDM and frequency-division multiplexing (FDM) can advantageously be employed in US data communication as our phase retrieval algorithms can be applied to both schemes.

BRIEF DESCRIPTION OF THE DRAWING

A more complete understanding of the present disclosure may be realized by reference to the accompanying drawing in which:

FIG. 3(A) and FIG. 3(B) are a pair of plots showing simultaneous retrieval of: FIG. 3(A) vibration induced phase signals at separate PON drop fiber paths; and FIG. 3(B) their corresponding frequency spectra according to aspects of the present disclosure;

FIG. 5(A) forward phase retrieval on PON upstream (US) channels using a centralized laser source and coherent receiver; and FIG. 5(B) phase retrieval on FDM sub-bands simultaneously according to aspects of the present disclosure.

Figure 1:
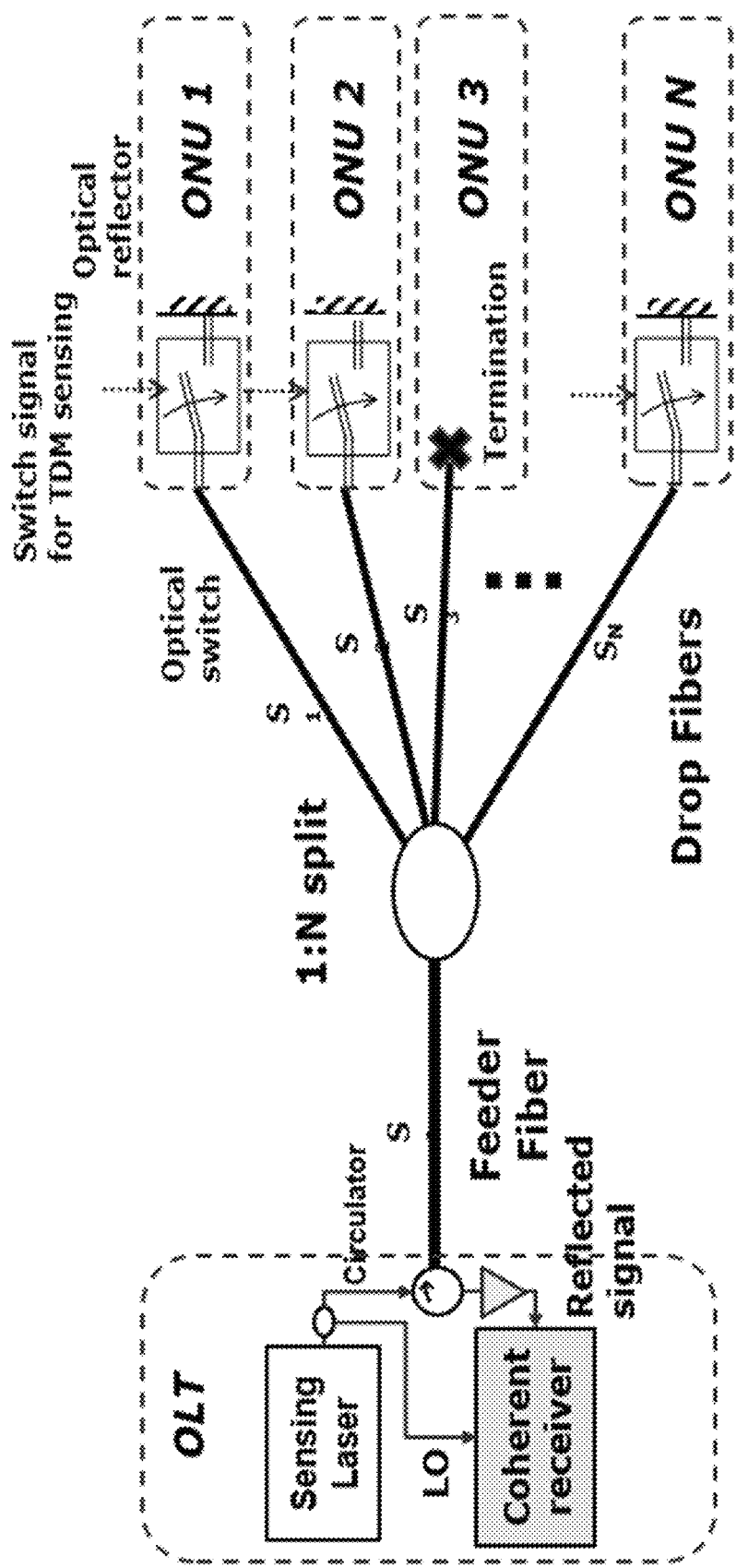
FIG. 1 is a schematic diagram illustrating vibration detection over PON architecture via optical phase interferometry and TDM switching control on reflected optical signals according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that a passive optical network (PON) is a fiber-optic telecommunications technology for delivering broadband network access to end-customers. Its architecture implements a point-to-multipoint topology in which a single optical fiber serves multiple endpoints by using unpowered (passive) fiber optic splitters to divide the fiber bandwidth among the endpoints. Passive optical networks are often referred to as the last mile between an Internet service provider (ISP) and its customers.

A passive optical network includes an optical line terminal (OLT) typically located at a service provider's central office (hub) and a number of optical network units (ONUs) or optical network terminals (ONTs), nearer end users. A PON reduces the amount of fiber and central office equipment required compared with point-to-point architectures. A passive optical network is a form of fiber-optic access network.

In most cases, downstream signals are broadcast to all premises sharing multiple fibers. Encryption can prevent eavesdropping. Upstream signals are combined using a multiple access protocol, usually time-division multiple access (TDMA).

FIG. 1 illustrates an architectural arrangement according to aspects of the present disclosure. As may be observed, the illustrative arrangement includes a PON system including a feeder fiber interconnecting an OLT to a 1:N splitter followed by N drop fibers to separate ONUs located the remote nodes.

For data communications over such a PON, downstream (DS) and upstream (US) signals are designed to withstand a single-trip splitting loss of 3× $\log_2 N$ dB. For a typical 32~64 split PON, this single-trip loss will be in the range of 15~18 dB. Since a sensing system operating over such a PON needs to detect all fiber paths in the PON, an interrogation unit needs to be installed at a centralized OLT location. As most distributed fiber sensing (DFS) systems rely on weak back scattering effects in fiber, the detection scheme typically cannot overcome the additional round-trip loss of 30~36-dB imposed by the 1:N splitters, and the performance will be seriously degraded.

In our innovative arrangement such as that shown, an optical phase interferometry system is employed on a PON. Instead of using back scattering of the fiber, the optical signal is reflected to the interrogator using a reflector at the ONU. A low phase-noise laser is used for phase interferometry and placed at the OLT. A coherent receiver is used to detect the reflected optical signals from the ONUs after centralized amplification, with the local oscillator (LO) supplied by a same laser source. Since our phase interrogation uses continuous optical signal (instead of pulsed) and most of the signal power is reflected, we can still achieve high optical signal-to-noise (OSNR) even without optical amplification at the ONU.

Further, with our innovative arrangement, the phase interferometry system can provide segment-based vibration sensing on the PON architecture, identifying the source of vibration from the feeder fiber segment ($S_0$) and each of the drop fiber segments ($S_1 \sim S_N$). To distinguish the source of the vibrations, our invention employed a TDM switching scheme on the reflected optical signal at each ONU, so only one reflected signal will be measured at the centralized interrogator at one time. The phase measurement on each drop-fiber branch will be performed in sequence, with the TDM-controlled optical switches taking turns to close. Other ways of providing vibration source identification is possible using payload carrying communication channel, and the detail will be subsequently discussed.

Ultra-stable optical lasers with very low phase noise can be employed in regular straight-line fiber networks to detect vibration along the fiber route, as reported in several previously published papers. For systems and methods according to aspects of the present disclosure, we provide details of changes needed to perform optical phase interferometry on a PON network, and key differences compared to previous disclosures.

According to an aspect of the present disclosure, we position a sensing laser and coherent receiver at the OLT to detect the optical phase change induced by the PON networks. As we use the same laser as the LO to the coherent receiver, it is a self-phase beating configuration such as we have previously reported, and which effectively suppresses low frequency phase noise intrinsic to the laser. Advantageously, any remaining laser phase noise can be further suppressed by a phase-lock loop to track the low-frequency drift of the laser, and the remaining change in phase will be attributed to the physical vibration in the PON.

One of the many differences between systems and methods according to the present disclosure and the prior art is that the optical signal is reflected back from the remote ONUs on the same fiber paths back to OLT for detection. As the PON architecture distributes continuous interrogating signal(s) out to all ONUs at the same time, our systems and methods use TDM switching control on each individual drop fiber path.

Figure 2:
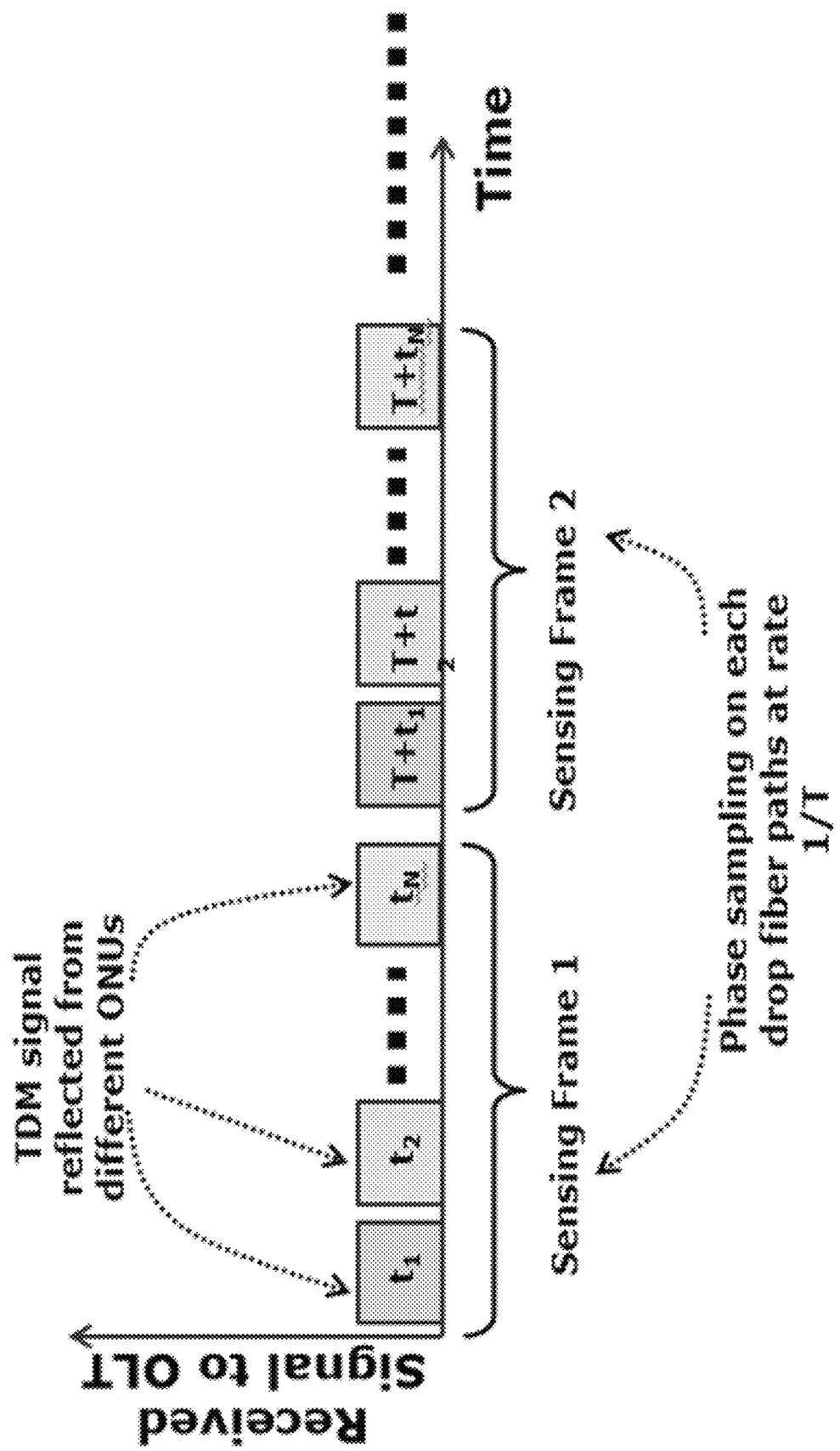
FIG. 2 is a schematic diagram illustrating TDM switching mechanism to reflected signal regulation (from ONU to OLT) according to aspects of the present disclosure.

In such an illustrative configuration, only one ONU reflects the interrogating optical signal back to the centralized interrogator at one time, as illustratively shown in FIG. 2, to provide segment-based vibration detection.

With TDM switching, vibrations affecting separate drop fibers can be detected using different time slots within a sensing frame. One or more phase samples may be taken within one frame for each optical path, and since most vibrations of interest are at low frequencies, we advantageously employ a low-cost optical switch for TDM with millisecond level switching speed. For ONUs that do not require sensing along the drop fiber paths, the fiber can be terminated as shown in ONU 3 in FIG. 1.

Since most PON data communication systems uses TDM for upstream signaling, synchronization of the TDM switching for phase interferometry can be done by utilizing/borrowing timing information from the data communication equipment. A separate time synchronization system for the TDM switches can also be provided by the phase interrogator, where a centralized clock is distributed to each ONU and a token is given to each ONU to close the optical switch at the assigned time window within each sensing frame. When so implemented, the length of the sensing frame, T, determines the sampling speed (1/T) of the phase interrogation scheme.

Figure 3A:
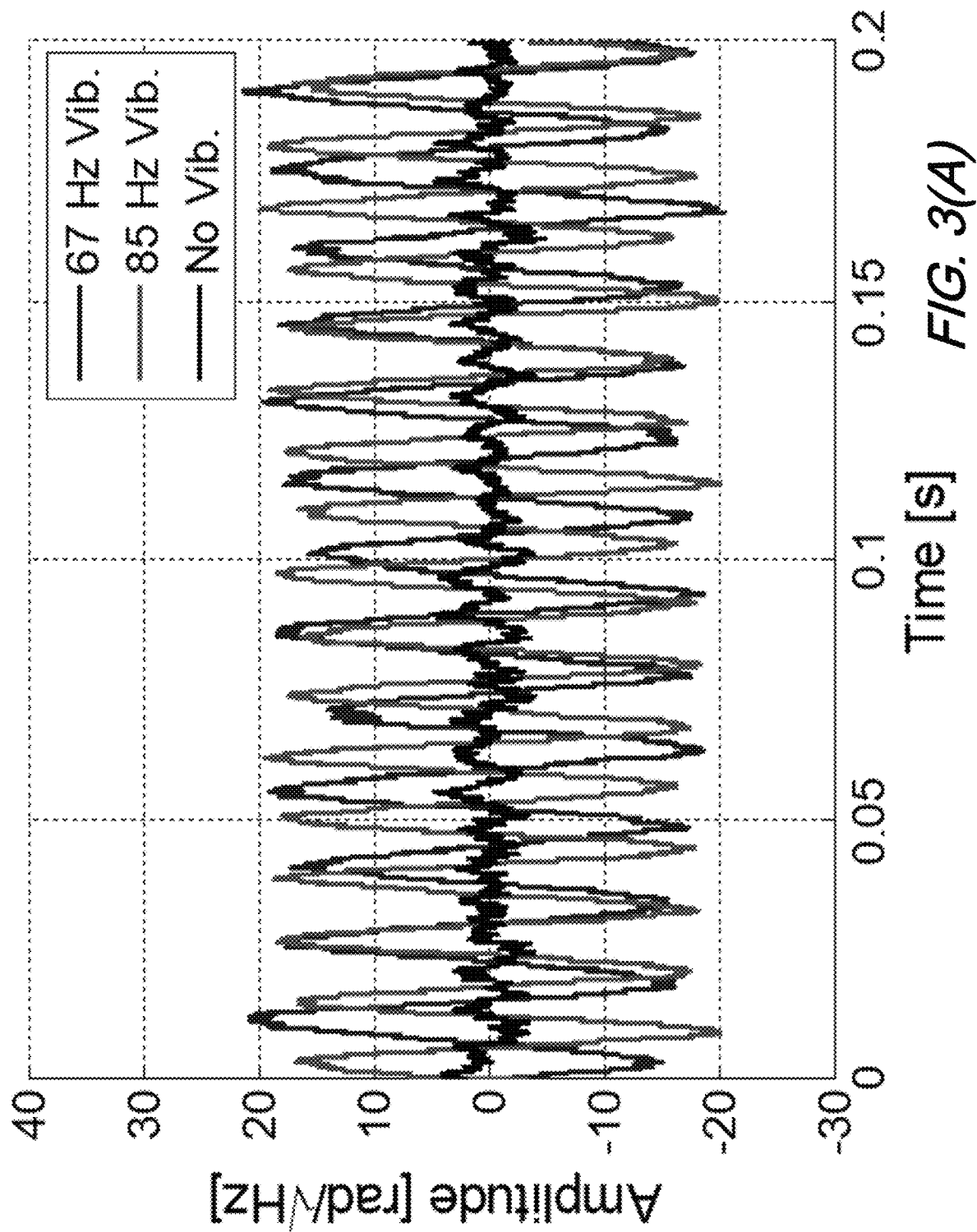
Figure 3B:
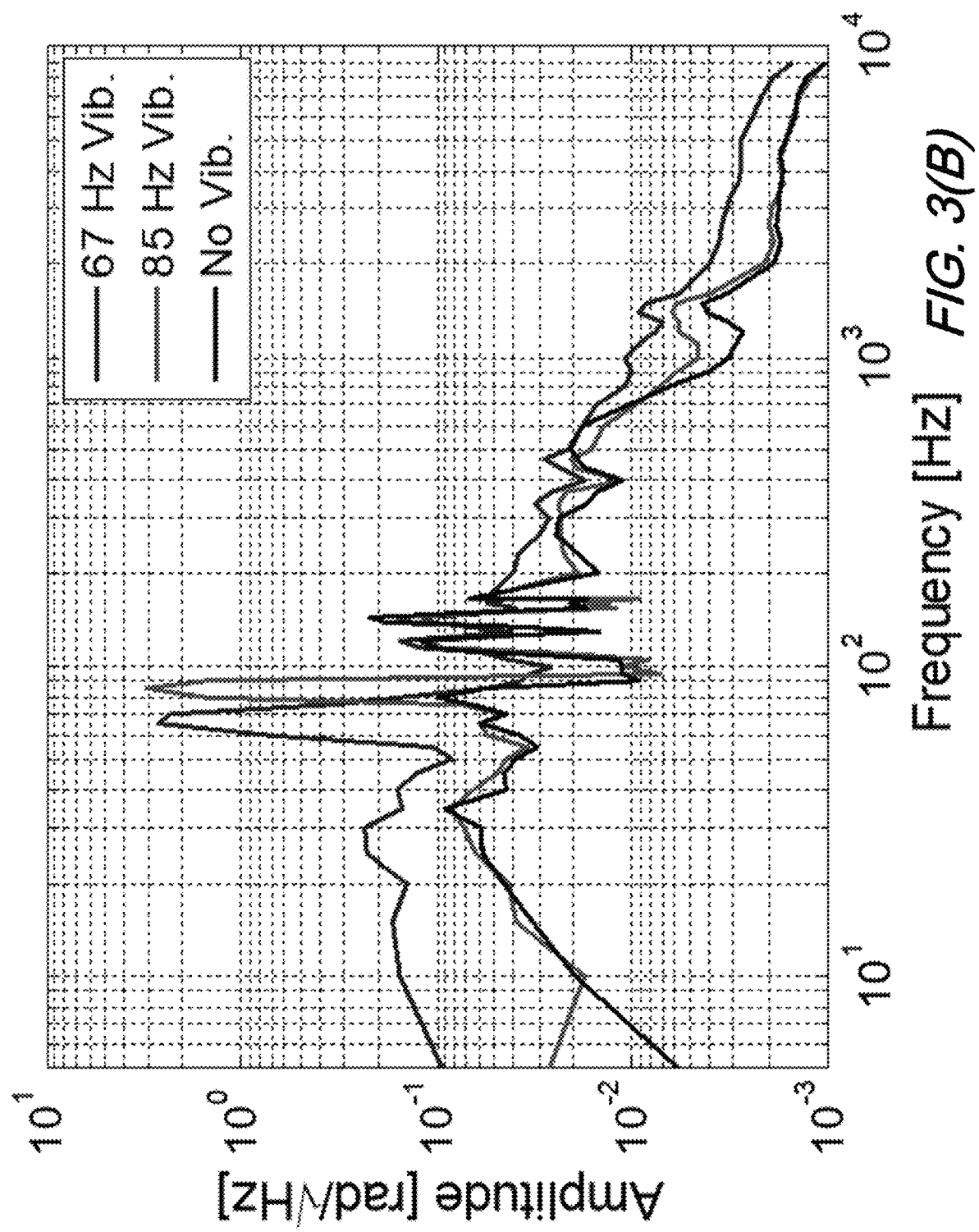

To evaluate our inventive system and method, a simple verification was performed on an experimental PON setup with 1:32 splits to demonstrate the TDM switching control on the reflected phase interferometry. One feeder fiber and three drop fibers are connected before and after the splitter, each with the length of ~1-km. Each of the three drop fibers is connected to an optical switch and a reflector as shown in FIG. 1, and the TDM control sampling frame rate (1/T) was set to 20 kHz (10-us window each). Two piezo-electric (PZT) fiber stretchers are provided in two of the drop fiber paths, modulated with sinusoidal strain signals to emulate vibrations on fiber. Simultaneous phase interferometry is measured on the three paths using the TDM sampling method at the centralized location, and the results are shown in FIG. 3(A) and FIG. 3(B). As may be observed, three separate time-domain waveforms are recorded (FIG. 3(A)), showing the phase measured on the quiet fiber path (black) and the two paths with PZT (blue and red). By analyzing the frequency contents in FIG. 3(B), we can further identify the difference in the modulated frequencies of the PZTs on two separate paths. The plotted results clearly show that the invention can detect the different vibrations and identify the fiber paths they originated from.

In addition to identifying the vibration sources from different drop fiber paths, our invention can also provide a way to identify vibration on the feeder fiber. As all the phase interferometry paths in the PON architecture will undoubtedly go through the feeder fiber, a vibration exerted on the feeder fiber will be present on all the recorded phase measurements. Therefore, by performing a simple signal correlation among all recorded waveforms, the vibration on feeder fiber can be identified when there is high correlation. Since most PON systems installed for 5G front-haul networks are relatively short, the segment-based vibration localization will be sufficient to identify events at different locations within the network, without the complicated location calibration process a typical DFS will need for system installation.

There are potential situations in the PON system that can create additional interference and noise to our phase interferometry measurements. Since the signal bandwidth used for our measurements is extremely small compared to normal data traffics (<1-MHz vs. 10-GHz and above), the OSNR on the reflected optical signal will be quite high even with the round-trip loss of the splitter. The main source of signal degradation can be from other reflections in the PON system where there is no control over. We list the power levels of the signal and interference below:

$$P_{sig} = P_0 \cdot e^{-2aL_F} \cdot e^{-2aL_D} \cdot \frac{1}{N^2} \quad (1)$$

$$P_{interf} \approx P_0 \cdot e^{-\frac{aL_F}{2}} \cdot C_{Ray}L_F + \\ P_0 \cdot \left(C_{conn} + e^{-2aL_F} \cdot C_{conn}\right) + P_0 \cdot e^{-2aL_F} \cdot e^{-\frac{aL_{D\_avg}}{2}} \cdot C_{Ray}L_{D\_avg} \cdot \frac{1}{N} + \\ P_0 \cdot e^{-2aL_F} \cdot \left(C_{conn} + e^{-2aL_{D\_avg}} \cdot C_{conn}\right) \cdot \frac{1}{N} \quad (2)$$

Where $P_0$ is the optical power sent into the feeder fiber, and N is the number of splits in the PON. $L_F$, $L_D$, and $L_{D\_avg}$ are the lengths of feeder fiber, drop fiber for measurement, and averaged length of all drop fibers. $C_{Ray}$ is the Rayleigh scattering coefficient of the fiber, and $C_{conn}$ is reflection ratio caused by connectors and splices.

Using the parameters of fiber loss=−0.2 dB/km, N=32, $L_D=L_{D\_avg}$=1 km, $C_{conn}$=−50 dB, $C_{Ray}$=−72 dB/m we found $P_{sig}$ is ~−31-dB below $P_0$ ($L_F$=1 km). The four terms in $P_{interf}$ are found to be ~−42-dB, −47-dB, −57.5-dB, and −62.5-dB below $P_0$. The last two terms, which are more than 10-dB lower than the first two terms, can therefore be dropped. The signal to interference ratio (SIR, $P_{sig}$ over $P_{interf}$) is ~10-dB in this case. However, if the length of feeder fiber $L_F$ increases, or there is high reflection due to connector or bad splice before the splitter, then the phase measurement performance will drop due to lower SIR. In event like this, a gain element can be placed at the ONU to increase $P_{sig}$, and the gain provided will add directly to the SIR. One example of such gain element is a semiconductor optical amplifier (SOA). In fact, a reflective SOA (RSOA) provides all three functions of reflection, TDM switching, and gain.

The phase measurement system employs continuous signal interferometry on the PON architecture and can adopt similar optical power levels as data communication. Unlike DFS, it is free of the high intensity pulses that create nonlinearity interference, which is detrimental to other communication channels in the same fiber. Therefore, the forwarding phase interferometry sensing system can be combined with data communication system on the same fiber using WDM approach.

Figure 4:
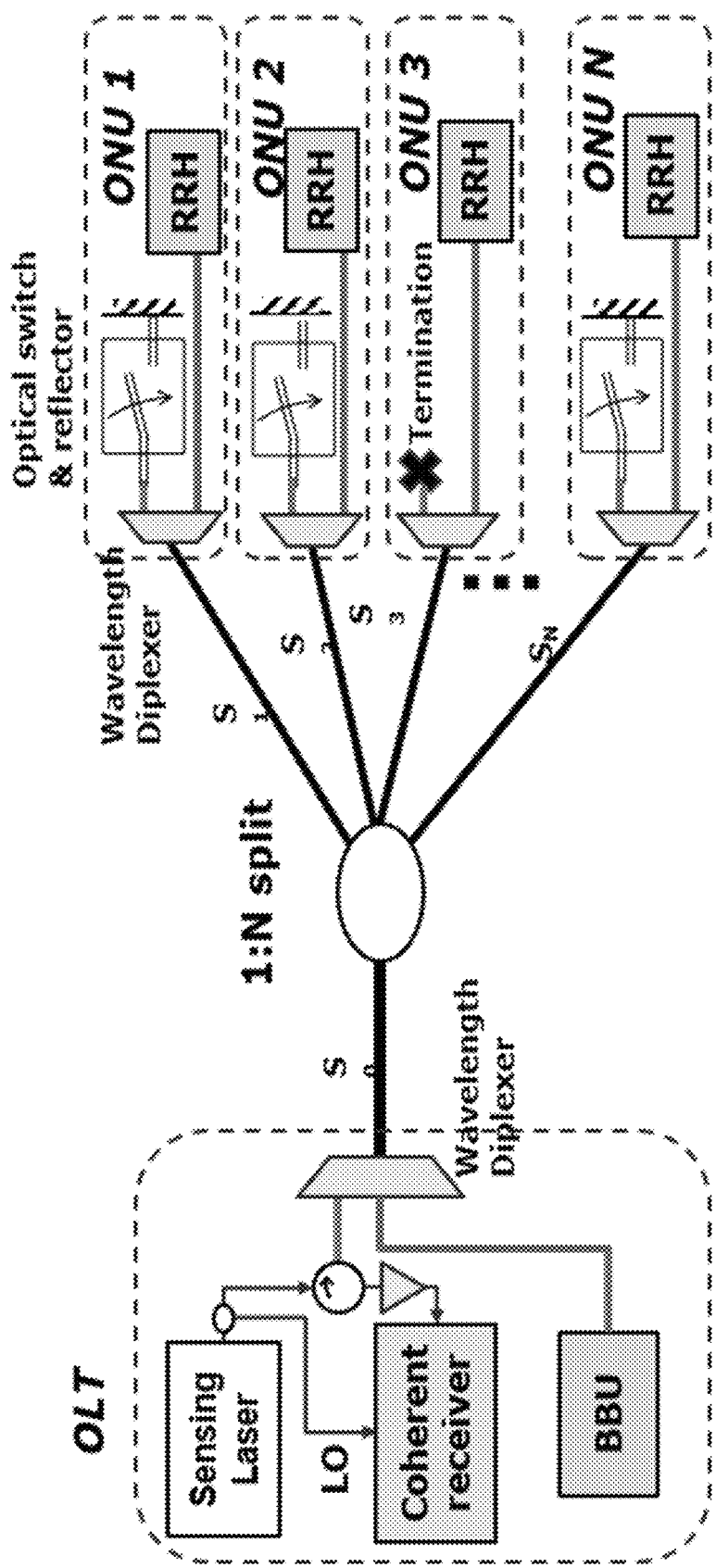
FIG. 4 is a schematic diagram of an illustrative arrangement for forward phase retrieval sensing system overlay on 5G C-RAN using WDM according to aspects of the present disclosure.

FIG. 4 is an schematic diagram of an illustrative arrangement showing forward phase retrieval sensing overlay on 5G C-RAN using WDM and illustrates an example of how to integrate the sensing system and C-RAN system using standard wavelength diplexers. In this case, the diplexers will be placed at the OLT and ONU immediately after the fiber connection, to multiplex and de-multiplex the data and sensing signals.

The integration between our forward phase interferometry system and the data communication channels can be carried out even further. We have previously noted that the optical phase information can be retrieved from a typical coherent receiver DSP module. In a PON architecture, the optical phase change due to vibration on fiber can also be retrieved the same way, if a coherent receiver is implemented. The higher cost of the ultra-low phase-noise laser and the coherent receiver can be absorbed if the hardware cost can be shared by all the ONUs.

Figure 5A:
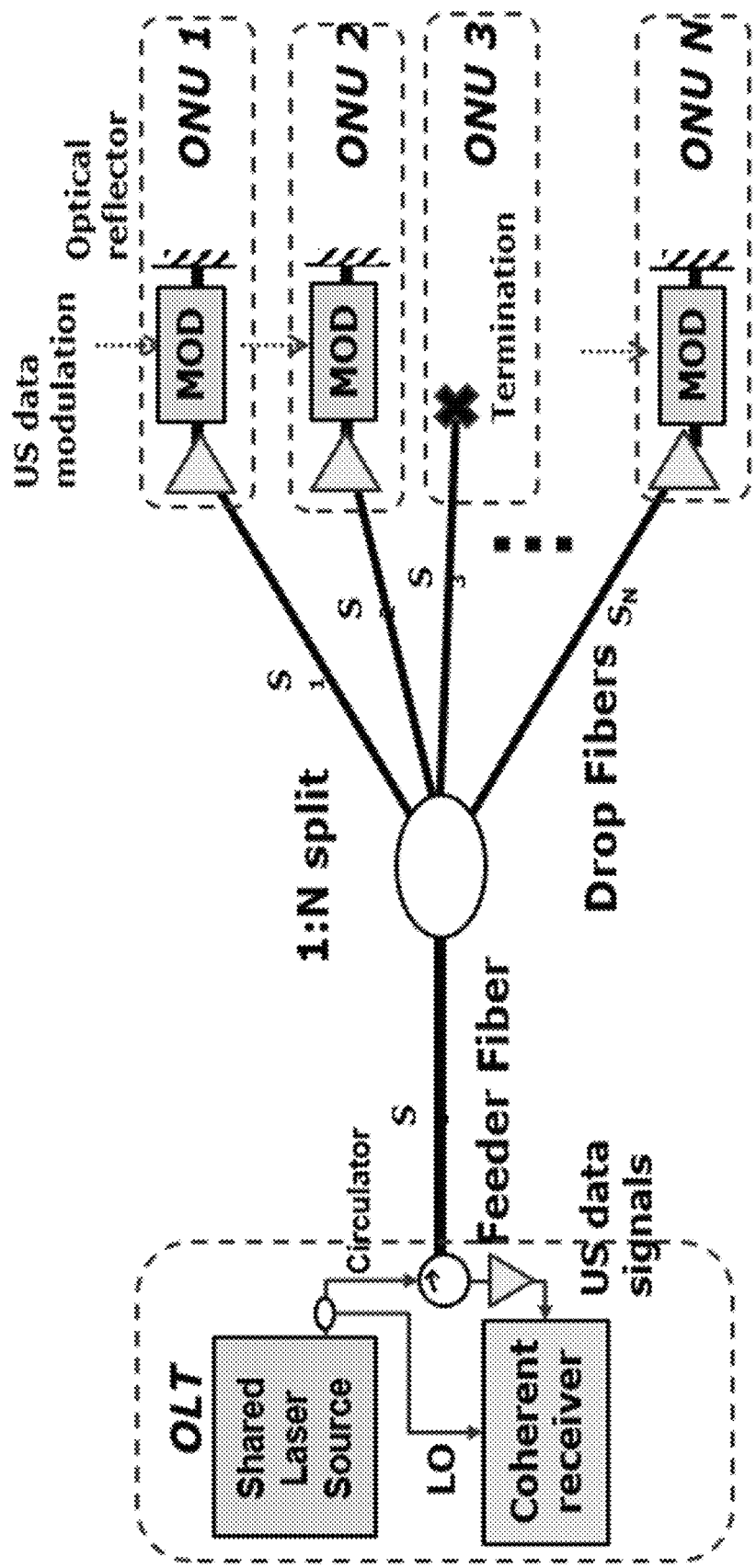
FIG. 5(A) and FIG. 5(B) illustrate.
Figure 5B:
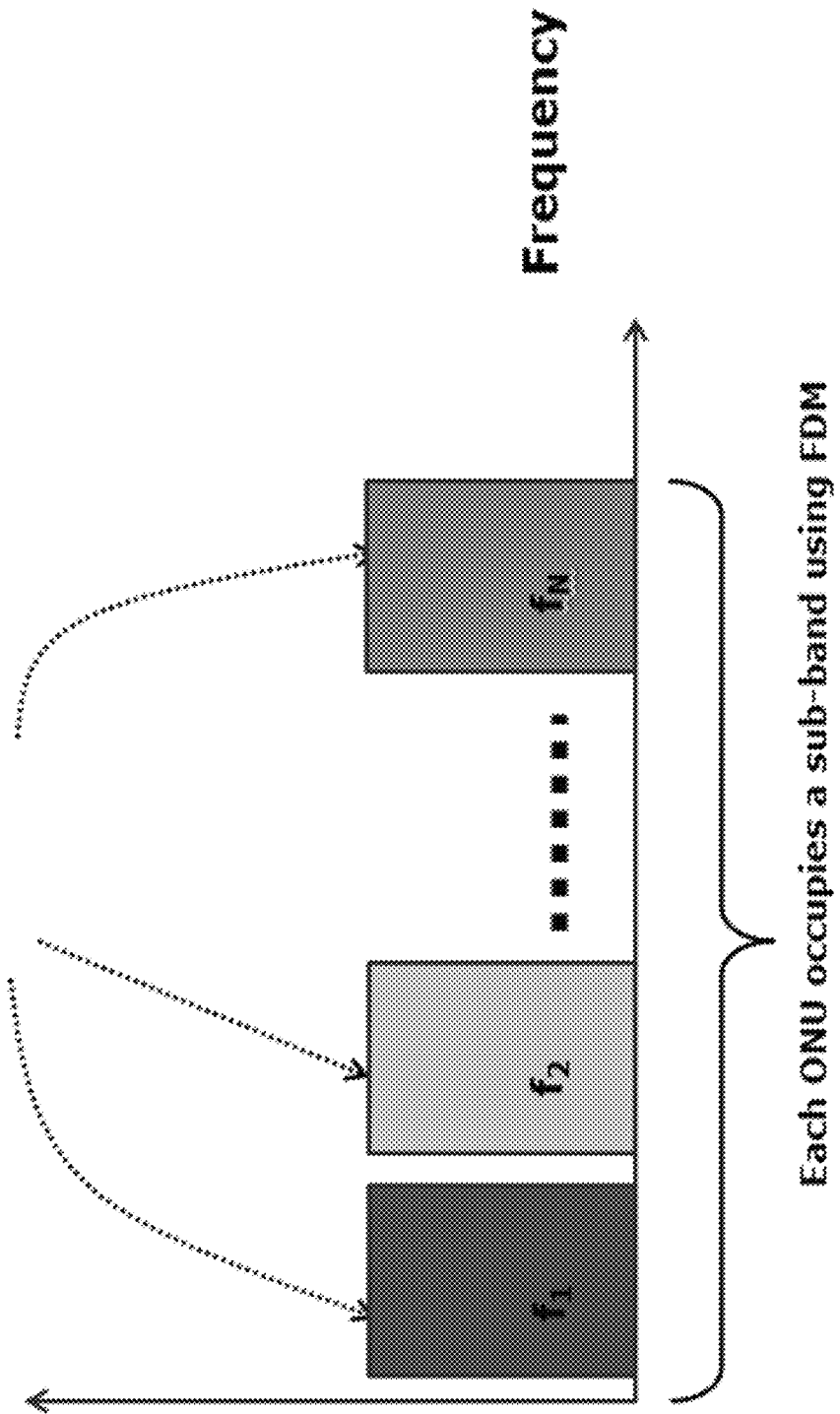

FIG. 5(A) illustrates an example of such where the laser source is shared for all ONUs for US communication, and a coherent receiver is used at the OLT. Shared laser US communication has been proposed in PON before, and there are low-cost solutions for the required optical components at ONUs. In fact, R-SOA is one of the integrated solution available for low-speed data modulation. If the US data communication employs TDM, then the vibration source identification will follow the same TDM control frames as shown in FIG. 2. However, there can be FDM implementation on the US communication channels, where a frequency sub-band is used for each ONU. In this case, the coherent receiver DSP can retrieve the phase information on all frequency sub-bands simultaneously without the need for TDM frame regulation, as shown in FIG. 5(B). In this case, the phase sampling speed is no longer limited to a preset frame rate.

Figure 6:
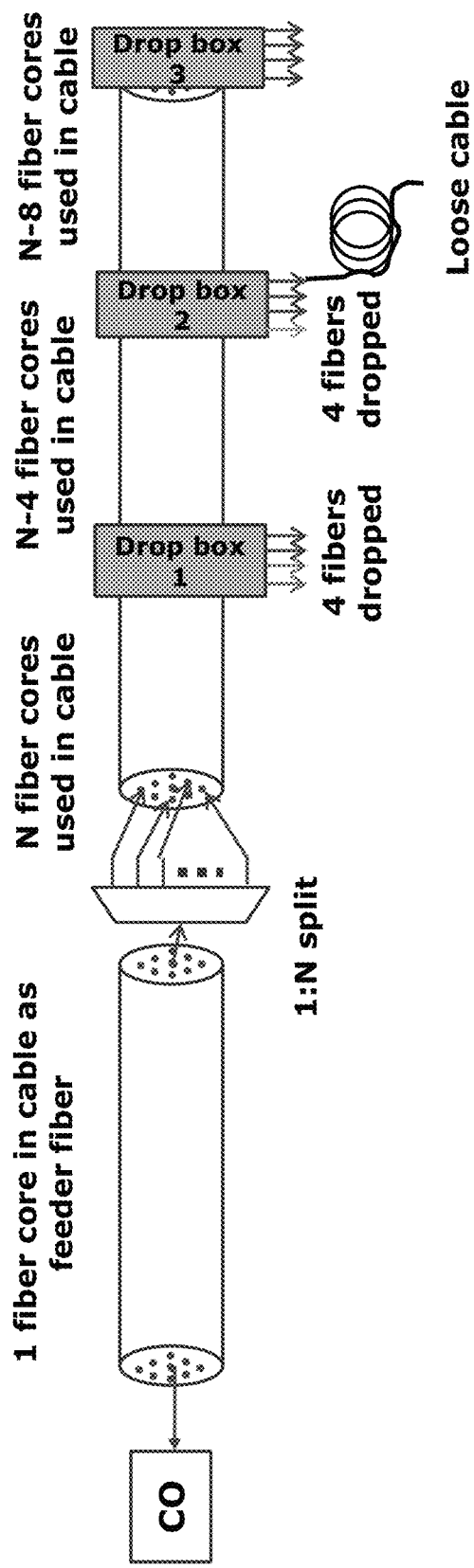
FIG. 6. is a schematic diagram of an illustrative physical cable connection configuration for PON systems in 5G front-haul according to aspects of the present disclosure.

In actual cable installations and connections for PON systems in 5G application, the physical routes of each drop fibers do not spread out immediately after the splitter. As shown in FIG. 6, the drop fibers may share the same route in a beginning of a route, as neighboring fiber cores in the same cable, to minimize cable installation cost. A few fibers are dropped each time at a drop box, while the remaining one(s) will continue (i.e., within the same cable) to the next drop box. In this configuration, the segment-based vibration identification in our invention can also provide the ability to distinguish sources at difference sections along the shared cable, provided that the sections are separated by at least one drop box.

For example, if the vibration occurs between drop box 1 and drop box 2, we will expect to see vibration on (N−4) of the phase signal retrieved after drop box 1. Thus, by comparing the correlation between any two-phase signals retrieved from the drop box 1, and their correlations to another signal that was dropped later, the system can identify whether the vibration occurs before or after drop box 1. The same operation can be done in steps for every drop box, and we can locate the vibration sources on the shared cable in between each drop boxes.

Vibration source identification after a fiber is dropped work similarly as illustrated in FIG. 1 and FIG. 2. One useful case scenario is the identification of loose cables detached or fallen from its original pole fixtures, as illustrated in FIG. 6 at drop box 2. The loose cables could cause potential safety hazards if they were fallen on the road or blown off by strong wind.

At this point, while we have presented this disclosure using some specific examples, those skilled in the art will recognize that our teachings are not so limited. Accordingly, this disclosure should be only limited by the scope of the claims attached hereto.

The invention claimed is:

1. A system for vibration sensing over passive optical networks (PON) using forwarding optical phase retrieval and time domain multiplexed (TDM) switching, the system comprising:
an optical line terminal (OLT);
a plurality of optical network units (ONUs);
a passive optical network optically connecting the OLT to the ONUs);
wherein the plurality of ONUs each include an optical switch optically connected to the PON and to an optical reflector; and
said OLT is configured to provide a continuous optical phase interferometry signal to the PON and receive signals reflected by the plurality of optical reflectors.

2. The system of claim 1 wherein the OLT includes a coherent receiver for reception/detection of the reflected signals.

3. The system of claim 2 wherein the OLT includes a single laser for both sensing and local oscillation.

4. The system of claim 3 further configured to selectively activate an optical switch in each one of the plurality of ONUs, such that only one of the plurality of ONUs provides a reflected signal at a given point of time.

5. The system of claim 4 wherein the PON carries telecommunications traffic simultaneously with the continuous optical phase interferometry signal and any reflected signal(s).

6. The system of claim 5 wherein the PON includes N ONUs a 1×N splitter, a single feeder fiber optically connecting the OLT to the 1×N splitter and N drop fibers optically connecting the 1×N splitter to each individual ONU, respectively.

7. The system of claim 6 wherein the OLT determines reflection sources other than the ONU.

8. The system of claim 6 wherein the continuous optical phase interferometry signal provided to the PON is reflected back to the OLT for detection on a same fiber path on which it was provided.

* * * * *